US012674397B2

(12) United States Patent
Park

(10) Patent No.: US 12,674,397 B2
(45) Date of Patent: Jul. 7, 2026

(54) METHOD AND APPARATUS FOR PATCH-LEVEL SUPERVISED CONTRASTIVE LEARNING TO LEARN TEMPORAL PRESENTATION

(71) Applicant: Socra AI Inc., Seoul (KR)

(72) Inventor: Jung Bae Park, Seoul (KR)

(73) Assignee: Socra AI Inc., Seoul (KR)

( * ) Notice: Subject to any disclaimer, the term of this patent is extended or adjusted under 35 U.S.C. 154(b) by 796 days.

(21) Appl. No.: 18/177,846

(22) Filed: Mar. 3, 2023

(65) Prior Publication Data

US 2024/0256881 A1 Aug. 1, 2024

(30) Foreign Application Priority Data

Jan. 31, 2023 (IN) .............................. 202311006249

(51) Int. Cl.
*F01D 5/28* (2006.01)
*G06N 3/09* (2023.01)
(52) U.S. Cl.
CPC ............... *F01D 5/288* (2013.01); *G06N 3/09* (2023.01); *F05D 2220/32* (2013.01); *F05D 2240/303* (2013.01); *F05D 2300/611* (2013.01)
(58) Field of Classification Search
CPC .......... F01D 5/288; G06N 3/09; G06N 3/044; G06N 3/045; G06N 3/084; F05D 2220/32; F05D 2240/303; F05D 2300/611; F04D 29/388
See application file for complete search history.

(56) References Cited

U.S. PATENT DOCUMENTS

2019/0278378 A1* 9/2019 Yan .......................... G06F 3/017
2020/0104395 A1* 4/2020 Bhatia ................. G06F 16/2428

OTHER PUBLICATIONS

Kang et al. ("Self-Attentive Sequential Recommendation", 2018 IEEE) (Year: 2018).*
Chen et al. ("A Simple Framework for Contrastive Learning of Visual Representations", PMLR 119, 2020) (Year: 2020).*
Henaff et al. ("Data-Efficient Image Recognition with Contrastive Predictive Coding", PMLR 119, 2020) (Year: 2020).*
Anonymous Author(s), "Supervised Contrastive Predictive Coding: Investigating Auxiliary Tasks for Knowledge Tracing and Dropout Prediction", KDD '22, Aug. 14-18, 2022, pp. 1-11.

* cited by examiner

*Primary Examiner* — Imad Kassim
(74) *Attorney, Agent, or Firm* — USX IP LLC

(57) ABSTRACT

A method of training a sequence encoder according to an embodiment of the present application includes: acquiring interaction data for each user; extracting an embedding vector from log data of the interaction data for each user; acquiring a reference vector from the embedding vector; acquiring a hidden vector from the reference vector through the sequence encoder; acquiring a projection embedding vector from the hidden vector; and updating a parameter of the sequence encoder using a contrastive learning technique.

9 Claims, 7 Drawing Sheets

INTERACTION DATA OF FIRST USER (FIRST INTERACTION DATA)

Figure 5:
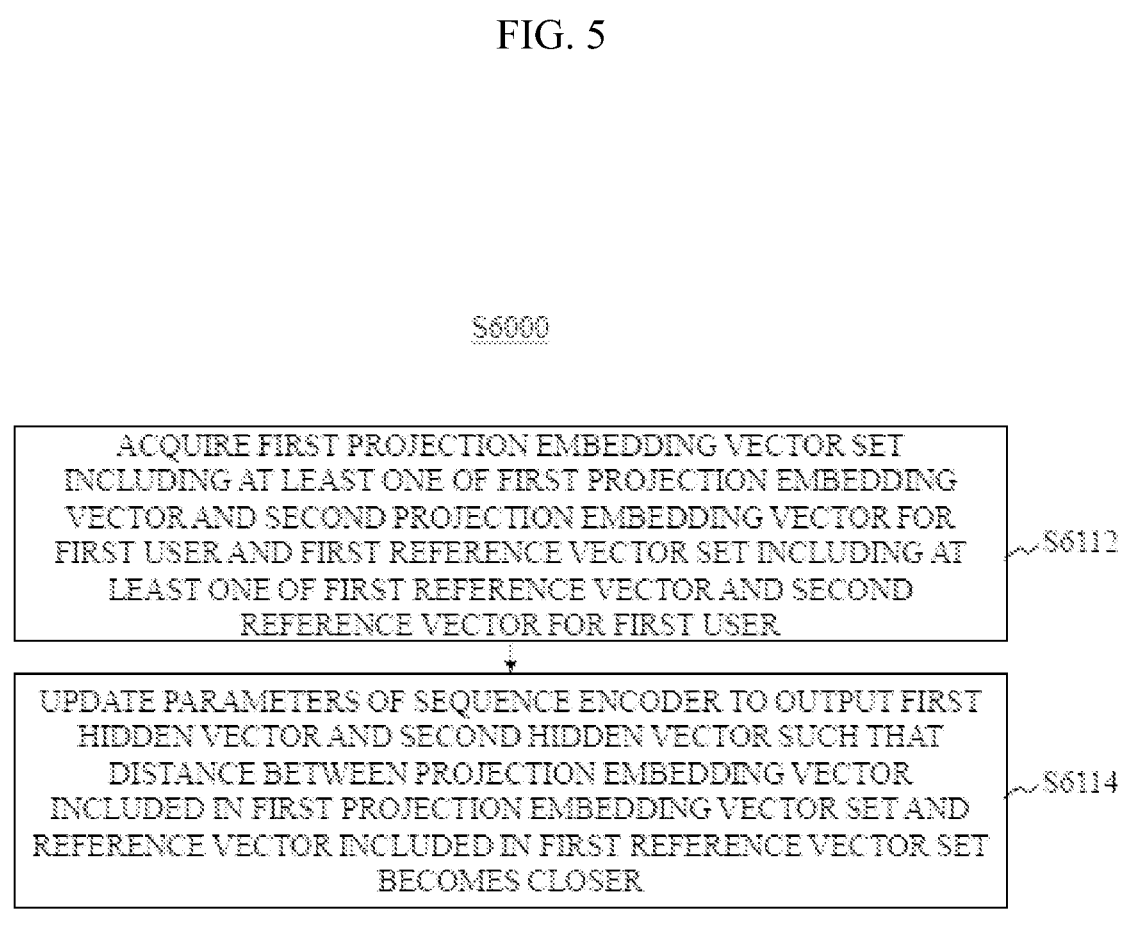

ACQUIRE FIRST PROJECTION EMBEDDING VECTOR SET INCLUDING AT LEAST ONE OF FIRST PROJECTION EMBEDDING VECTOR AND SECOND PROJECTION EMBEDDING VECTOR FOR FIRST USER AND FIRST REFERENCE VECTOR SET INCLUDING AT LEAST ONE OF FIRST REFERENCE VECTOR AND SECOND REFERENCE VECTOR FOR FIRST USER ~S6112

UPDATE PARAMETERS OF SEQUENCE ENCODER TO OUTPUT FIRST HIDDEN VECTOR AND SECOND HIDDEN VECTOR SUCH THAT DISTANCE BETWEEN PROJECTION EMBEDDING VECTOR INCLUDED IN FIRST PROJECTION EMBEDDING VECTOR SET AND REFERENCE VECTOR INCLUDED IN FIRST REFERENCE VECTOR SET BECOMES CLOSER ~S6114

Figure 6:
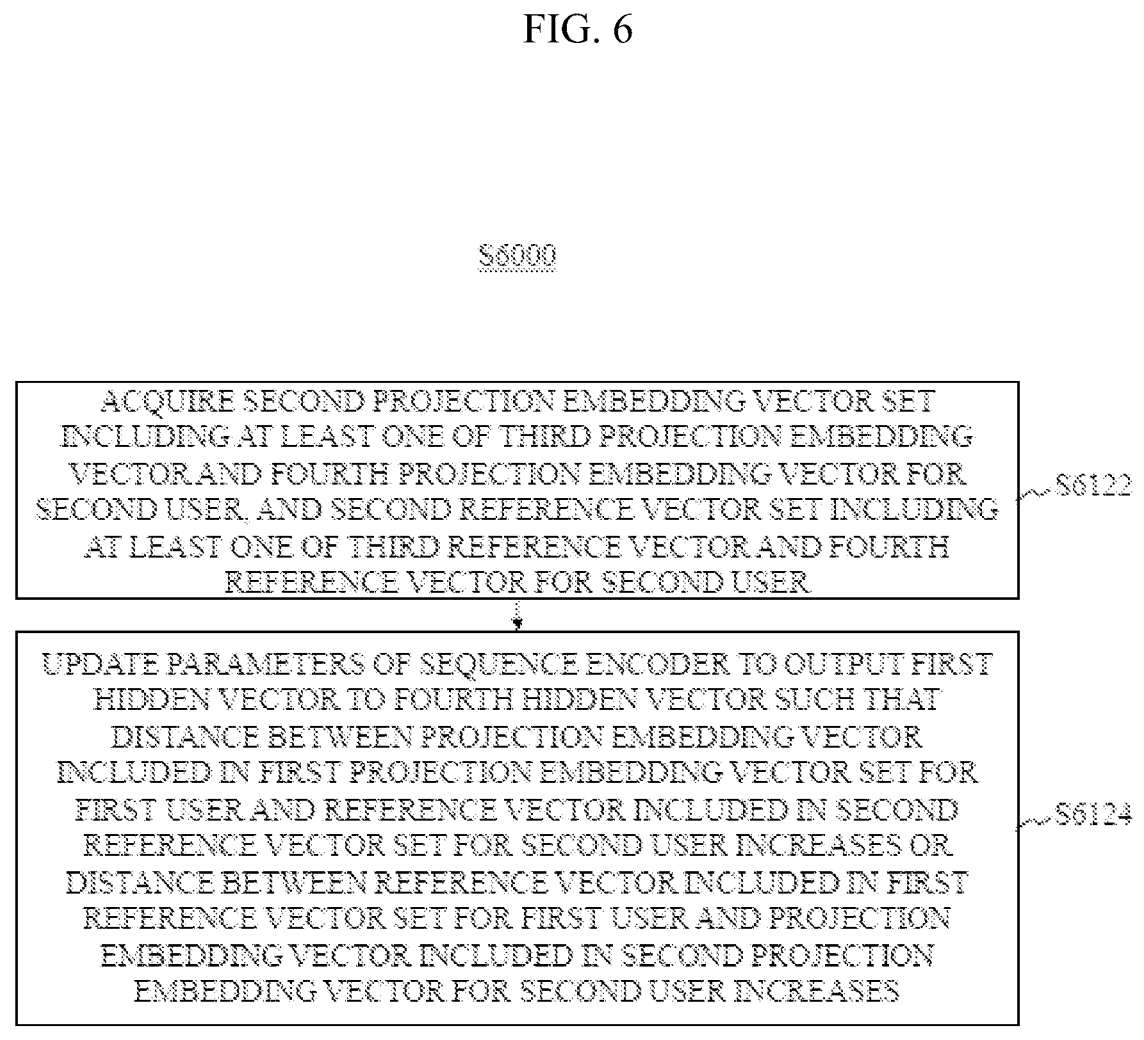

ACQUIRE SECOND PROJECTION EMBEDDING VECTOR SET INCLUDING AT LEAST ONE OF THIRD PROJECTION EMBEDDING VECTOR AND FOURTH PROJECTION EMBEDDING VECTOR FOR SECOND USER, AND SECOND REFERENCE VECTOR SET INCLUDING AT LEAST ONE OF THIRD REFERENCE VECTOR AND FOURTH REFERENCE VECTOR FOR SECOND USER ~S6122

UPDATE PARAMETERS OF SEQUENCE ENCODER TO OUTPUT FIRST HIDDEN VECTOR TO FOURTH HIDDEN VECTOR SUCH THAT DISTANCE BETWEEN PROJECTION EMBEDDING VECTOR INCLUDED IN FIRST PROJECTION EMBEDDING VECTOR SET FOR FIRST USER AND REFERENCE VECTOR INCLUDED IN SECOND REFERENCE VECTOR SET FOR SECOND USER INCREASES OR DISTANCE BETWEEN REFERENCE VECTOR INCLUDED IN FIRST REFERENCE VECTOR SET FOR FIRST USER AND PROJECTION EMBEDDING VECTOR INCLUDED IN SECOND PROJECTION EMBEDDING VECTOR FOR SECOND USER INCREASES ~S6124

Figure 7:
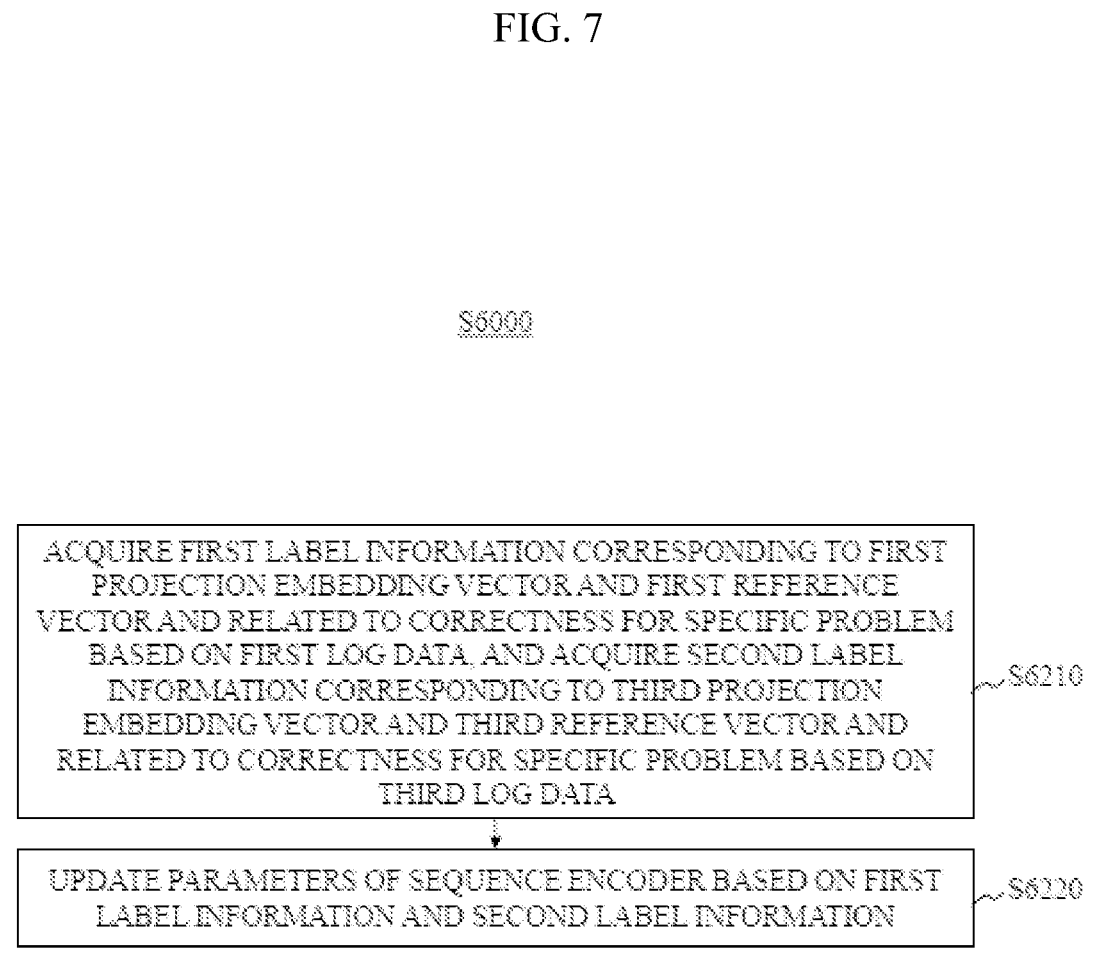

ACQUIRE FIRST LABEL INFORMATION CORRESPONDING TO FIRST
PROJECTION EMBEDDING VECTOR AND FIRST REFERENCE
VECTOR AND RELATED TO CORRECTNESS FOR SPECIFIC PROBLEM
BASED ON FIRST LOG DATA, AND ACQUIRE SECOND LABEL
INFORMATION CORRESPONDING TO THIRD PROJECTION       ~S6210
EMBEDDING VECTOR AND THIRD REFERENCE VECTOR AND
RELATED TO CORRECTNESS FOR SPECIFIC PROBLEM BASED ON
THIRD LOG DATA

UPDATE PARAMETERS OF SEQUENCE ENCODER BASED ON FIRST       ~S6220
LABEL INFORMATION AND SECOND LABEL INFORMATION

METHOD AND APPARATUS FOR PATCH-LEVEL SUPERVISED CONTRASTIVE LEARNING TO LEARN TEMPORAL PRESENTATION

CROSS-REFERENCE TO RELATED APPLICATION

This application claims priorities to and the benefit of Korean Patent Application No. 10-2022-0027580, filed on Mar. 3, 2022 and Korean Patent Application No. 10-2023-0026429, filed on Feb. 28, 2023 the disclosure of which is incorporated herein by reference in its entirety.

BACKGROUND

1. Field of the Invention

The present invention relates to a method and apparatus for using a new patch-level supervised contrastive method to improve the performance of user modeling using data (log) of data mining, including an education domain. Specifically, the present invention relates to a method of training a sequence encoder for extracting sequential characteristic information of a user based on interaction data representing an interaction between a user and a user terminal, and an electronic device therefor.

2. Discussion of Related Art

Supervised learning is a method of training an artificial intelligence model in a state in which labels for data, that is, explicit answers, are given. For example, the method is a method of performing training in the form of (data, label).

The contrastive learning method is a method of training a model that maps a near object to a near distance and a distant object to a far distance in a virtual space. The existing contrastive learning methodologies are mostly applied at the sample level, and rarely applied at the patch level including an interaction level. Here, the patch may mean a portion corresponding to a partial local area in the entire area including a minimum area that a researcher may divide for learning.

For example, when a user's state changes over time, such as user modeling, the existing contrastive learning methodology may be less useful.

As the methodology of solving the above problem, the ContrastSeg methodology is proposed, but there is a problem in that the methodology is for classification in the image field and not for application in the temporal context field.

Accordingly, there is a need to develop a new method of extracting sequence characteristic information of a user at a patch level based on temporal context data having sequential characteristics of a user, and an apparatus for performing the same.

SUMMARY OF THE INVENTION

The present invention is directed to providing a patch-level method and apparatus for supervised contrastive learning.

Problems to be solved by the present invention are not limited to the above-described objects, and objects that are not mentioned will be clearly understood by those skilled in the art to which the present invention pertains from the present specification and the accompanying drawings.

According to an aspect of the present invention, there is provided a method of training a sequence encoder, including: acquiring interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem; extracting a first embedding vector from the first log data, extracting a second embedding vector from the second log data, extracting a third embedding vector from the third log data, and extracting a fourth embedding vector from the fourth log data, through an embedder; projecting a vector on a first vector space to a vector on a second vector space through a projection layer to acquire a first reference vector from the first embedding vector, a second reference vector from the second embedding vector, a third reference vector from the third embedding vector, and a fourth reference vector from the fourth embedding vector; acquiring a first hidden vector from the first embedding vector, a second hidden vector from the second embedding vector, a third hidden vector from the third embedding vector, and a fourth hidden vector from the fourth embedding vector, through the sequence encoder; projecting the vector on the first vector space to a vector on a third vector space through the projection layer to acquire a first projection embedding vector from the first hidden vector, a second projection embedding vector from the second hidden vector, a third projection embedding vector from the third hidden vector, and a fourth projection embedding vector from the fourth hidden vector; and updating the parameters of the sequence encoder using a contrastive learning technique.

According to another aspect of the present invention, there is provided an electronic apparatus including: a transceiver configured to receive interaction data indicating an interaction between a user and a user terminal; and a processor configured to train a sequence encoder for extracting sequential characteristic information of a user based on the interaction data, in which the processor may be configured to acquire interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem, extract a first embedding vector from the first log data, extract a second embedding vector from the second log data, extract a third embedding vector from the third log data, and extract a fourth embedding vector from the fourth log data, through an embedder, project a vector on a first vector space to a vector on a second vector space through a projection layer to acquire a first reference vector from the first embedding vector, a second reference vector from the second embedding vector, a third reference vector from the third embedding vector, and a fourth reference vector from the fourth embedding vector, acquire a first hidden vector from the first embedding vector, a second hidden vector from the second embedding vector, a third hidden vector from the third embedding vector, and a fourth hidden vector from the fourth embedding vector, through the sequence encoder, project the vector on the first vector space to a vector on a third vector space through the projection layer to acquire a first projection embedding vector from the first hidden vector, a second projection embedding vector from the second hidden vector, a third projection embedding vector from the third hidden vector, and a fourth projection embedding vector from the fourth hidden vector, and update the parameters of the sequence encoder using a contrastive learning technique.

Technical solutions of the present invention are not limited to the above-described solutions, and solutions that are not mentioned will be clearly understood by those skilled in the art to which the present invention pertains from the present specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is a flowchart embodying an operation of updating the parameters of the sequence encoder according to the embodiment of the present application;

FIG. 6 is a flowchart embodying the operation of updating the parameters of the sequence encoder according to the embodiment of the present application; and FIG. 7 is a flowchart embodying the operation of updating the parameters of the sequence encoder according to the embodiment of the present application.

DETAILED DESCRIPTION OF EXEMPLARY EMBODIMENTS

Figure 1:
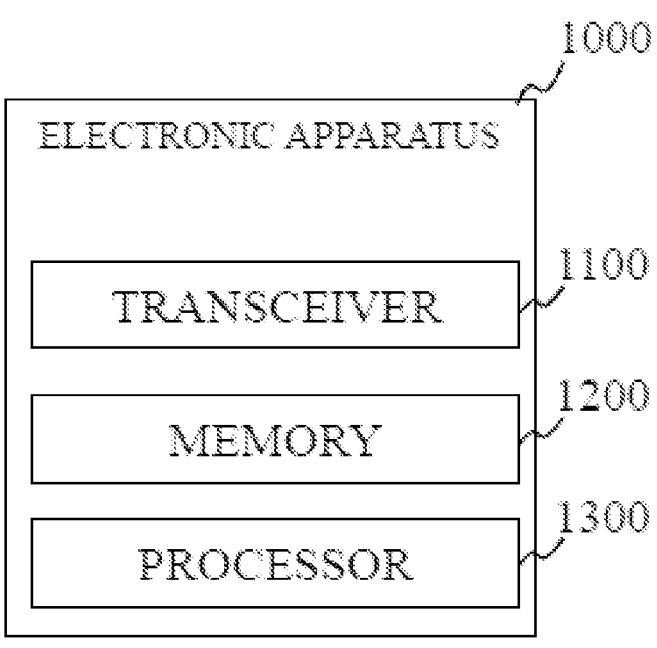
FIG. 1 is a schematic diagram illustrating an electronic apparatus according to an embodiment of the present application.

Objects, features, and advantages of the present application will become more obvious from the following detailed description taken in conjunction with the accompanying drawings. However, the present application may be variously modified and have several exemplary embodiments. Hereinafter, specific exemplary embodiments of the present invention will be illustrated in the accompanying drawings and described in detail.

Like reference numerals in principle denote like constituent elements throughout the specification. Further, elements having the same function within the scope of the same idea illustrated in the drawings of each embodiment will be described using the same reference numerals, and overlapping descriptions thereof will be omitted.

When it is determined that a detailed description for known functions or configurations related to the present application may obscure the gist of the present disclosure, detailed descriptions thereof will be omitted. In addition, numbers (for example, first, second, etc.) used in the description process of the present specification are only identification symbols for distinguishing one component from other components.

In addition, terms "module" and "unit" for components used in the following embodiments are used only in order to easily make the disclosure. Therefore, these terms do not have distinct meanings or roles in themselves.

In the following embodiments, singular forms include plural forms unless the context clearly dictates otherwise.

In the following embodiments, the term "include," "have," or the like means that a feature or element described in the specification is present, and it does not preclude the possibility that one or more other features or components may be added.

Sizes of components may be exaggerated or reduced in the accompanying drawings for convenience of description. For example, the size and thickness of each component illustrated in the drawings are arbitrarily indicated for convenience of description, and the present invention is not necessarily limited to those illustrated.

In a case where certain embodiments can be otherwise implemented, the order of specific processes may be performed different from the order in which the processes are described. For example, two processes described in succession may be performed substantially simultaneously, or may be performed in an order opposite to the order described.

In the following embodiments, when components are connected, it includes not only a case where components are directly connected but also a case where components are indirectly connected via certain component interposed between the components.

For example, when components are electrically connected in this specification, not only the case where the components are directly electrically connected, but also the case where components are interposed therebetween and the components are electrically connected indirectly is included.

A method of training a sequence encoder according to an embodiment of the present application includes: acquiring interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem; extracting a first embedding vector from the first log data, extracting a second embedding vector from the second log data, extracting a third embedding vector from the third log data, and extracting a fourth embedding vector from the fourth log data, through an embedder; projecting a vector on a first vector space to a vector on a second vector space through a projection layer to acquire a first reference vector from the first embedding vector, a second reference vector from the second embedding vector, a third reference vector from the third embedding vector, and a fourth reference vector from the fourth embedding vector; acquiring a first hidden vector from the first embedding vector, a second hidden vector from the second embedding vector, a third hidden vector from the third embedding vector, and a fourth hidden vector from the fourth embedding vector, through the sequence encoder; projecting the vector on the first vector space to a vector on a third vector space through the projection layer to acquire a first projection embedding vector from the first hidden vector, a second projection embedding vector from the second hidden vector, a third projection embedding vector from the third hidden vector, and a fourth projection embedding vector from the fourth hidden vector; and updating the parameters of the sequence encoder using a contrastive learning technique.

According to the embodiment of the present application, the updating of the parameters of the sequence encoder may include acquiring a first projection embedding vector set including at least one of the first projection embedding vector and the second projection embedding vector for the first user and a first reference vector set including at least one of the first reference vector and the second reference vector for the first user; and updating the parameters of the sequence encoder to output the first hidden vector and the second hidden vector such that a distance between a projection embedding vector included in the first projection embedding vector set and a reference vector included in the first reference vector set becomes closer.

According to the embodiment of the present application, the updating of the parameters of the sequence encoder may further include: acquiring a second projection embedding vector set including at least one of the third projection embedding vector and the fourth projection embedding vector for the second user and a second reference vector set including at least one of the third reference vector and the fourth reference vector for the second user; and updating the parameters of the sequence encoder to output the third hidden vector and the fourth hidden vector such that a distance between a projection embedding vector included in the second projection embedding vector set and a reference vector included in the second reference vector set becomes closer.

According to the embodiment of the present application, the updating of the parameters of the sequence encoder may further include: updating the parameters of the sequence encoder to output the first hidden vector to the fourth hidden vector such that a distance between the projection embedding vector included in the first projection embedding vector set for the first user and the reference vector included in the second reference vector set for the second user increases or a distance between the reference vector included in the first reference vector set for the first user and the projection embedding vector included in the second projection embedding vector set for the second user increases.

According to the embodiment of the present application, the updating of the parameters of the sequence encoder may further include: acquiring first label information corresponding to the first projection embedding vector and the first reference vector and related to correctness for a specific problem based on the first log data, and acquiring second label information corresponding to the third projection embedding vector and the third reference vector and related to the correctness for the specific problem based on the third log data; and updating the parameters of the sequence encoder based on the first label information and the second label information.

According to the embodiment of the present application, the updating of the parameters of the sequence encoder based on the first label information and the second label information may include, when the first label information and the second label information are the same, updating the parameters of the sequence encoder to output the first hidden vector and the third hidden vector such that a distance between the first projection embedding vector and the third reference vector becomes closer or a distance between the third projection embedding vector and the first reference vector becomes closer.

According to the embodiment of the present application, the updating of the parameters of the sequence encoder based on the first label information and the second label information may include, when the first label information and the second label information are different, updating the parameters of the sequence encoder to output the first hidden vector and the third hidden vector such that a distance between the first projection embedding vector and the third reference vector increases or a distance between the third projection embedding vector and the first reference vector increases. According to an embodiment of the present application, a computer-readable recording medium on which a program for executing the method of training a sequence encoder is recorded in a computer may be provided.

According to an embodiment of the present application, an electronic apparatus includes: a transceiver configured to receive interaction data indicating an interaction between a user and a user terminal; and a processor configured to train a sequence encoder for extracting sequential characteristic information of a user based on the interaction data, in which the processor may be configured to acquire interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem, extract a first embedding vector from the first log data, extract a second embedding vector from the second log data, extract a third embedding vector from the third log data, and extract a fourth embedding vector from the fourth log data, through an embedder, project a vector on a first vector space to a vector on a second vector space through a projection layer to acquire a first reference vector from the first embedding vector, a second reference vector from the second embedding vector, a third reference vector from the third embedding vector, and a fourth reference vector from the fourth embedding vector, acquire a first hidden vector from the first embedding vector, a second hidden vector from the second embedding vector, a third hidden vector from the third embedding vector, and a fourth hidden vector from the fourth embedding vector, through the sequence encoder, project the vector on the first vector space to a vector on a third vector space through the projection layer to acquire a first projection embedding vector from the first hidden vector, a second projection embedding vector from the second hidden vector, a third projection embedding vector from the third hidden vector, and a fourth projection embedding vector from the fourth hidden vector, and update the parameters of the sequence encoder using a contrastive learning technique.

Hereinafter, a method of training a sequence encoder according to an embodiment of the present application and an electronic apparatus (or server, hereinafter referred to as an electronic apparatus) for performing the same will be described with reference to FIGS. 1 to 7.

FIG. 1 is a schematic diagram illustrating an electronic apparatus 1000 according to an embodiment of the present application.

The electronic apparatus 1000 according to the embodiment of the present application may include a transceiver 1100, a memory 1200, and a processor 1300.

The transceiver 1100 of the electronic apparatus 1000 may communicate with an arbitrary external device (or external server) including a user terminal. For example, the electronic apparatus 1000 may receive interaction data indicating an interaction between a user and a user terminal through the transceiver 1100. For example, the electronic apparatus 1000 may transmit arbitrary execution data for executing a neural network model including the trained sequence encoder to an arbitrary external device.

The electronic apparatus 1000 may access a network through the transceiver 1100 to transmit and receive various types of data. The transceiver 1100 may largely include a wired type and a wireless type. Since the wired type and the wireless type have their respective strengths and weaknesses, in some cases, the wired type and the wireless type may be simultaneously provided in the electronic apparatus 1000. Here, in the case of the wireless type, a communication method based on a wireless local area network (WLAN) such as Wi-Fi may be mainly used. Alternatively, in the case of the wireless type, cellular communication, for example, a long term evolution (LTE) and 5G-based communication method may be used. However, the wireless communication protocol is not limited to the above-described example, and any suitable wireless type communication method may be used. In the case of the wired type, local area network (LAN) or universal serial bus (USB) communication is a representative example, and other methods are also possible.

The memory 1200 of the electronic apparatus 1000 may store various types of information. Various types of data may be temporarily or semi-permanently stored in the memory 1200. An example of the memory 1200 may include a hard disk drive (HDD), a solid state drive (SSD), a flash memory, a read-only memory (ROM), a random access memory (RAM), or the like. The memory 1200 may be provided in a form embedded in the electronic apparatus 1000 or in a detachable form. The memory 1200 may store various types of data necessary for the operation of the electronic apparatus 1000 in addition to an operating system (OS) for driving the electronic apparatus 1000 or a program for operating each component of the electronic apparatus 1000.

The processor 1300 may control the overall operation of the electronic apparatus 1000. For example, the processor 1300 may control the overall operation of the electronic apparatus 1000, including an operation of updating parameters of a sequence encoder based on interaction data for each user, which will be described later. Specifically, the processor 1300 may load a program for the overall operation of the electronic apparatus 1000 from the memory 1200 and execute the program. The processor 1300 may be implemented as an application processor (AP), a central processing unit (CPU), a microcontroller unit (MCU), or similar devices thereto according to hardware, software, or a combination thereof. In this case, the processor 1300 may be provided in an electronic circuit form processing an electrical signal to perform a control function in terms of hardware, and may be provided in a program or code form driving the hardware circuit in terms of software.

Figure 2:
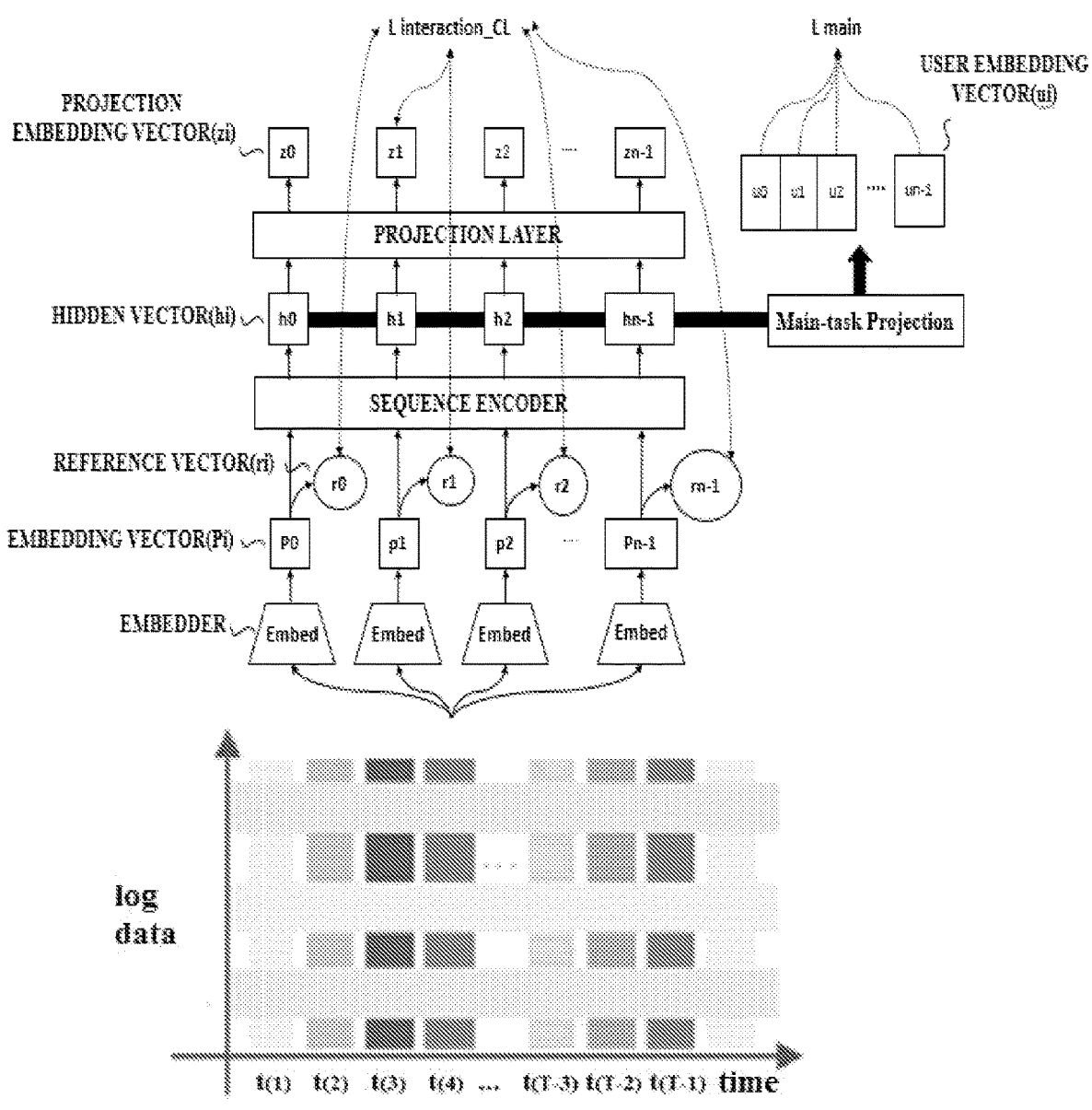
FIG. 2 is a diagram for describing a framework of a neural network model for extracting sequential characteristic information of a user from the user's interaction data according to an embodiment of the present application.

FIG. 2 is a diagram for describing a framework of a neural network model for extracting sequential characteristic information of a user from the user's interaction data according to an embodiment of the present application.

The neural network model according to the embodiment of the present application may include an embedder for extracting an embedding vector pi from interaction data, a sequence encoder for calculating a hidden vector hi from the embedding vector, a first projection layer for calculating a reference vector ri by projecting the embedding vector onto another vector space, and/or a second projection layer for calculating a projection embedding vector zi by projecting the hidden vector onto another vector space. Meanwhile, the first projection layer and the second projection layer may be configured in a form in which a part of the first projection layer and a part of the second projection layer are shared with each other.

In detail, the electronic apparatus 1000 may receive first interaction data including first log data of a first user at a first point in time and second log data of the first user at a second point in time. Here, the first log data and the second log data may include arbitrary information acquired according to the interaction between the first user and the user terminal, including user ID information of the first user at each point in time, information on correctness for a problem of the first user, and/or dropout information of the first user. That is, the first interaction data may include log data acquired according to the interaction (e.g., user ID information of the first user, information on correctness for the problem of the first user, and/or dropout information of the first user) between the first user and the first user terminal over time. Here, the dropout information may refer to information on whether a user leaves the actual application.

In this case, the electronic apparatus 1000 may input the first interaction data to the embedder and acquire an embedding vector output through the embedder. In detail, the electronic apparatus 1000 may acquire a first embedding vector from first log data and a second embedding vector from the second log data through the embedder. Here, the first embedding vector is a vector acquired by vectorizing interaction data of the first user at the first point in time, and the second embedding vector is a vector acquired by vectorizing interaction data of the first user at the second point in time.

Furthermore, the electronic apparatus 1000 may acquire a first reference vector from the first embedding vector and a second reference vector from the second embedding vector through the first projection layer configured to project an embedding vector on a first vector space to a reference vector on a second vector space. Here, the reference vector is an arbitrary vector including a local vector corresponding to each user's input data (i.e., interaction data).

Furthermore, the electronic apparatus 1000 may acquire a first hidden vector from the first embedding vector and a second hidden vector from the second embedding vector through a sequence encoder (e.g., a recurrent neural network (RNN) or transformer type encoder). That is, the hidden vector is any type of vector acquired through the sequence encoder, and may be used for a main task (e.g., a user's score prediction task, a problem recommendation task, and/or a dropout prediction task) to be described later.

Furthermore, the electronic apparatus 1000 may acquire a first projection embedding vector from the first hidden vector and a second projection embedding vector from the second hidden vector through the second projection layer (e.g., a layer in the form of a multi-layer perceptron (MLP)) configured to project a hidden vector on the first vector space to a projection embedding vector on a third vector space. Here, the projection embedding vector may serve as an anchor vector for contrastive learning. Furthermore, the projection embedding vector may be used to calculate a loss value together with the above-described reference vector, which will be described later.

Furthermore, although not illustrated in FIG. 2, the electronic apparatus 1000 may receive second interaction data including third log data of the second user at a third point in time and fourth log data of the second user at a fourth point in time. Here, the third log data and the fourth log data may include arbitrary information acquired according to the interaction between the second user and the user terminal, including user ID information of the second user at each point in time, information on correctness for a problem of the second user, and/or dropout information of the second user.

The electronic apparatus 1000 may acquire an embedding vector, a reference vector, a hidden vector, and a projection embedding vector corresponding to each of the third log data and the fourth log data based on the second interaction data related to the second user including the third log data of the second user at the third point in time and the fourth log data of the second user at the fourth point in time. In detail, the electronic apparatus 1000 may acquire a third embedding vector from the third log data and a fourth embedding vector from the fourth log data through the embedder. Here, the third embedding vector is a vector acquired by vectorizing interaction data of the second user at the third point in time, and the fourth embedding vector is a vector acquired by vectorizing interaction data of the second user at the fourth point in time.

Furthermore, the electronic apparatus 1000 may acquire a third reference vector from the third embedding vector and a fourth reference vector from the fourth embedding vector through the first projection layer configured to project a vector on the first vector space to a vector on the second vector space.

Furthermore, the electronic apparatus 1000 may acquire a third hidden vector from the third embedding vector and a fourth hidden vector from the fourth embedding vector through the sequence encoder (e.g., an RNN or transformer type encoder).

Furthermore, the electronic apparatus 1000 may acquire a third projection embedding vector from the third hidden vector and a fourth projection embedding vector from the fourth hidden vector through the second projection layer (e.g., a layer in the form of a multi-layer perceptron (MLP)) configured to project the vector on the first vector space to the vector on the third vector space.

In this case, the electronic apparatus 1000 according to the embodiment of the present application may calculate a loss value (Linteraction_CL in FIG. 2) based on the projection embedding vector and the reference vector calculated from each of the interaction data of the first user and the interaction data of the second user, and train the neural network model based on the calculated loss value.

Figure 3:
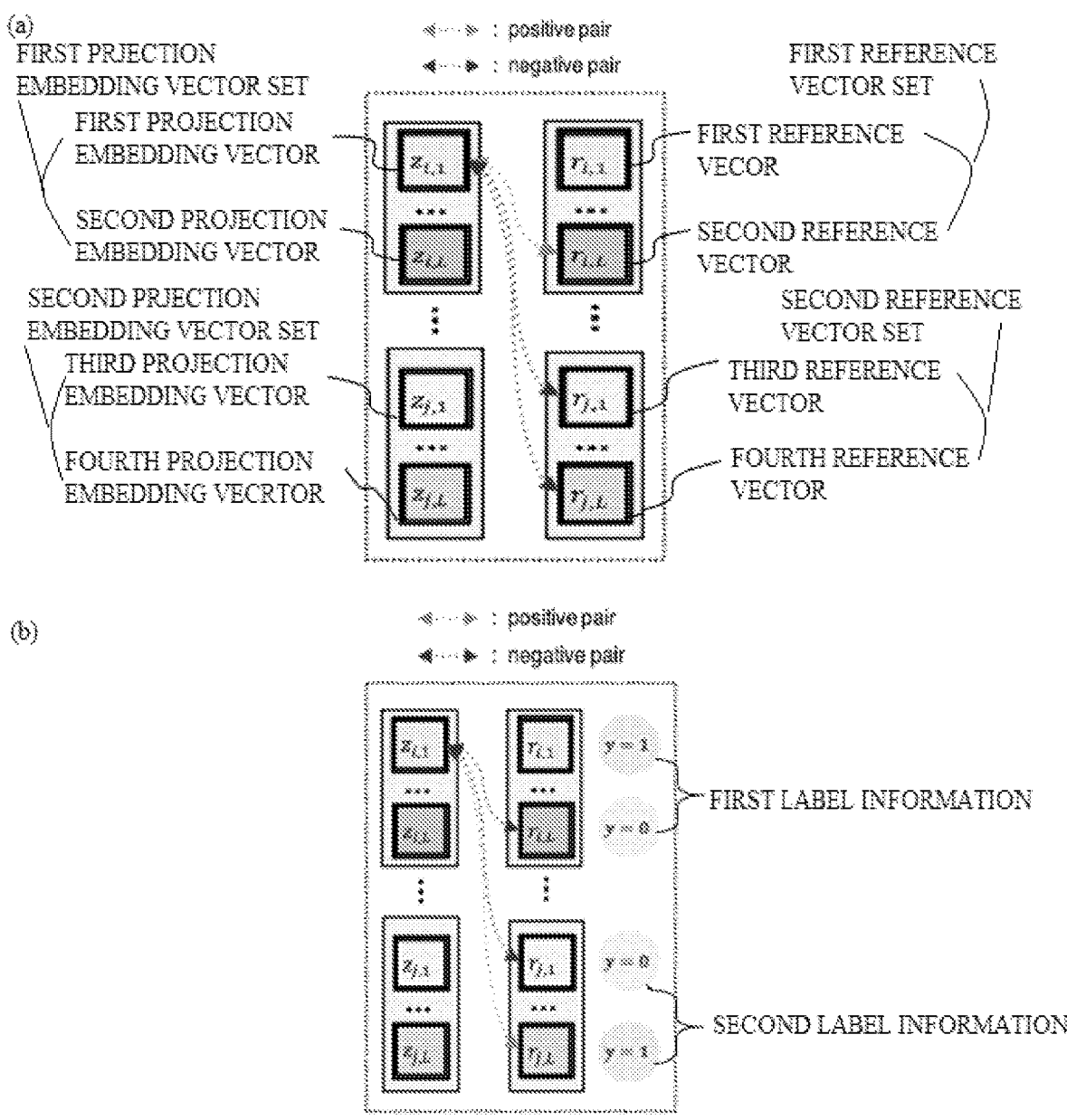
FIG. 3 shows diagrams for describing various aspects of a loss function for training a sequence encoder according to an embodiment of the present application.

Hereinafter, a loss function for training a sequence encoder according to an embodiment of the present application will be described in more detail with reference to FIG. 3. FIG. 3 shows diagrams for describing various aspects of a loss function for training a sequence encoder according to the embodiment of the present application. In detail, FIG. 3A is a diagram for describing an aspect of a first loss function for training a sequence encoder, and FIG. 3B is a diagram for describing an aspect of a second loss function for training a sequence encoder.

The electronic apparatus 1000 according to the embodiment of the present application may train the neural network model based on the projection embedding vector and the reference vector calculated from the interaction data for each user. In detail, the electronic apparatus 1000 may use a contrastive learning technique to update parameters of a sequence encoder based on a projection embedding vector set (e.g., first projection embedding vector and/or second projection embedding vector) acquired from the interaction data of the first user, a reference vector set (e.g., first reference vector and/or second reference vector), a projection embedding vector set (e.g., third projection embedding vector and/or fourth projection embedding vector) acquired from the interaction data of the second user, and/or a reference vector set (e.g., third reference vector and/or fourth reference vector), thereby training the neural network model.

The electronic apparatus 1000 according to the embodiment of the present application may be configured to update the parameters of the sequence decoder using user ID information such that a distance between vectors corresponding to the same user becomes closer and a distance between vectors corresponding to different users become longer.

For example, the electronic apparatus 1000 according to the embodiment of the present application may be configured to update the parameters of the sequence decoder using the user ID information included in the log data by setting the projection embedding vector and the reference vector derived from the interaction data of the same user as a positive pair. In detail, the electronic apparatus 1000 may be configured to update the parameters of the sequence encoder to output the hidden vector such that the distance between the projection embedding vector and the reference vector derived from the interaction data of the same user becomes closer.

For example, the electronic apparatus 1000 may update the parameters of the sequence encoder to output the first hidden vector and the second hidden vector such that the distance between the projection embedding vector (e.g., the first projection embedding vector and/or the second projection embedding vector) for the first user and the reference vector (e.g., the first reference vector and the second projection embedding vector) for the first user becomes closer.

For example, the electronic apparatus 1000 may update the parameters of the sequence encoder to output the third hidden vector and the fourth hidden vector such that the distance between the projection embedding vector (e.g., the third projection embedding vector and/or the fourth projection embedding vector) for the second user and the reference vector (e.g., the third reference vector and the fourth projection embedding vector) for the second user becomes closer.

As another example, the electronic apparatus 1000 according to the embodiment of the present application may be configured to update the parameters of the sequence decoder using the user ID information included in the log data by setting the reference vector and the projection embedding vector derived from each interaction data of different users as a negative pair. In detail, the electronic apparatus 1000 may be configured to update the parameters of the sequence encoder to output the hidden vector such that the distance between the projection embedding vector and the reference vector derived from each interaction data of different users increases.

For example, the electronic apparatus 1000 may update the parameters of the sequence encoder to output the first hidden vector to the fourth hidden vector such that the distance between the projection embedding vector (e.g., the first projection embedding vector and/or the second projection embedding vector) for the first user and the reference vector (e.g., the third reference vector and the fourth reference vector) for the second user increases.

For example, the electronic apparatus 1000 may update the parameters of the sequence encoder to output the first hidden vector to the fourth hidden vector such that the distance between the reference vector (e.g., the first reference vector and/or the second reference vector) for the first user and the projection embedding vector (e.g., the third projection embedding vector and the fourth projection embedding vector) for the second user increases.

According to an embodiment, the electronic apparatus 1000 may calculate a first loss function value based on the following Expression and update the parameters of the sequence encoder based on the calculated first loss function value.

$$\sum_{i,t} \frac{-1}{|A(i,\,t)|} \sum_{\alpha,t_m \in A(i,t)} \log \frac{\exp(z_{i,t} \cdot r_{\alpha,t_m}/\tau)}{\sum_{\gamma \in \Gamma(i,t)} \exp(z_{i,t} \cdot r_{\gamma}/\tau)} \qquad \text{Expression}$$

$|A(i,\, t)|$: cardinality of $A(i,\, t)$
i: Index of an arbitrary student
t: Relative activity time of the student i
z: Projection embedding vector
r: Reference vector $$\gamma : I \times T \equiv \{(i,\, t) \mid i \in I,\, t \in Ti\},$$

$$\Gamma(i,\, t) \equiv \gamma \setminus \{(i,\, t)\},$$

and $$A(i,\, t) \equiv \{(\alpha,\, tm) \in \Gamma(i,\, t) : \alpha = i\}$$

The electronic apparatus 1000 according to the embodiment of the present application may be configured to update the parameters of the sequence decoder using label information on the correctness for a problem (or a user's dropout information).

The electronic apparatus 1000 according to the embodiment of the present application may acquire label information indicating the correctness for a specific problem (or user dropout information). Hereinafter, an aspect of training the sequence decoder using the label information related to the correctness will be described, but this is only for convenience of description and should not be construed as being limited thereto, and the aspect of training the sequence decoder may be inferred and applied to training the sequence decoder using the label information related to the user dropout information.

In detail, the electronic apparatus 1000 may acquire the label information based on the correctness information of the log data of the interaction data. For example, the electronic apparatus 1000 may acquire first label information corresponding to the first projection embedding vector and the first reference vector based on the first log data and related to the correctness for the specific problem of the first user at the first point in time. For example, the electronic apparatus 1000 may acquire second label information corresponding to the third projection embedding vector and the third reference vector based on the third log data and related to the correctness for the specific problem of the second user at the third point in time. However, this is only an example, and the electronic apparatus 1000 may acquire the first label information and/or second label information manually labeled by an operator.

The electronic apparatus 1000 according to the embodiment of the present application may be configured to update the parameters of the sequence encoder based on the first label information and the second label information related to the correctness for the specific problem.

For example, when the first label information and the second label information related to the correctness for the specific problem are the same, the electronic apparatus 1000 may be configured to update the parameters of the sequence encoder such that the distance between the projection embedding vector corresponding to the first label information and the reference vector corresponding to the second label information becomes closer. Specifically, when the first label information and the second label information are the same (i.e., when the correctness for the specific problem of the first user at the first point in time matches the correctness for the specific problem of the second user at the third point in time), the electronic apparatus 1000 may be configured to update the parameters of the sequence encoder to output the first hidden vector and the third hidden vector such that the distance between the first projection embedding vector of the first user and the third reference vector of the second user becomes closer. Alternatively, when the first label information and the second label information are the same (i.e., when the correctness for the specific problem of the first user at the first point in time matches the correctness for the specific problem of the second user at the third point in time), the electronic apparatus 1000 may be configured to update the parameters of the sequence encoder to output the first hidden vector and the third hidden vector such that the distance between the first reference vector of the first user and the third projection embedding vector of the second user becomes closer.

For example, when the first label information and the second label information related to the correctness for the specific problem are different, the electronic apparatus 1000 may be configured to update the parameters of the sequence encoder to output the hidden vector such that the distance between the projection embedding vector (or reference vector) corresponding to the first label information and the reference vector (or projection embedding vector) corresponding to the second label information increases. Specifically, when the first label information and the second label information are different (i.e., when the correctness for the specific problem of the first user at the first point in time does not match the correctness for the specific problem of the second user at the third point in time), the electronic apparatus 1000 may be configured to update the parameters of the sequence encoder to output the first hidden vector and the third hidden vector such that the distance between the first projection embedding vector of the first user and the third reference vector of the second user increases. Alternatively, when the first label information and the second label information are different (i.e., when the correctness for the specific problem of the first user at the first point in time does not match the correctness for the specific problem of the second user at the third point in time), the electronic apparatus 1000 may be configured to update the parameters of the sequence encoder to output the first hidden vector and the third hidden vector such that the distance between the first reference vector of the first user and the third projection embedding vector of the second user increases.

In FIG. 3B, the description is focused on updating the parameters of the sequence encoder through contrastive learning according to whether the first label information of the first user and the second label information of the second user match. However, this is only for convenience of description, and the electronic apparatus 1000 may be configured to update the parameters of the sequence encoder through the contrastive learning according to whether the label information for one user matches. For example, when the correctness for the specific problem of the first user at the first point in time matches the correctness for the specific problem of the first user at the second point in time, the electronic apparatus 1000 may be configured to update the parameters of the sequence encoder to output the first hidden vector and the second hidden vector such that the distance between the first projection embedding vector of the first user and the second reference vector of the first user becomes closer. Alternatively, when the correctness for the specific problem of the first user at the first point in time matches the correctness for the specific problem of the first user at the second point in time, the electronic apparatus 1000 may be configured to update the parameters of the sequence encoder to output the first hidden vector and the second hidden vector such that the distance between the first reference vector of the first user and the second projection embedding vector of the first user becomes closer.

For example, when the correctness for the specific problem of the first user at the first point in time does not match the correctness for the specific problem of the first user at the second point in time, the electronic apparatus 1000 may be configured to update the parameters of the sequence encoder to output the first hidden vector and the second hidden vector such that the distance between the first projection embedding vector of the first user and the second reference vector of the first user increases. Alternatively, when the correctness for the specific problem of the first user at the first point in time does not match the correctness for the specific problem of the first user at the second point in time, the electronic apparatus 1000 may be configured to update the parameters of the sequence encoder to output the first hidden vector and the second hidden vector such that the distance between the first reference vector of the first user and the second projection embedding vector of the first user increases.

According to an embodiment, the electronic apparatus 1000 may calculate a second loss function value based on the following Expression and update the parameters of the sequence encoder based on the calculated second loss function value.

$$\sum_{i,t} \frac{-1}{|P(i,t)|} \sum_{p \in P(i,t)} \log \frac{\exp(z_{i,t} \cdot r_p / \tau)}{\sum_{\gamma \in \Gamma(i,t)} \exp(z_{i,t} \cdot r_\gamma / \tau)} \qquad \text{Expression}$$

i: Index of an arbitrary student
t: Relative activity time of the student i
z: Projection embedding vector
|P(i, t)|: cardinality of P(i, t)
r: Reference vector $$\gamma : I \times T \equiv \{(i, t) \,|\, i \in I, t \in Ti\},$$

$$\Gamma(i, t) \equiv \gamma \setminus \{(i, t)\}$$

According to an embodiment of the present application, the electronic apparatus 1000 may use a multitasking learning technique to train a model related to a main task using a hidden vector in which sequential characteristic information extracted through a sequence encoder is reflected. For example, the electronic apparatus 1000 may project the hidden vector extracted through the sequence encoder onto a vector space related to the main task, and acquire a user embedding vector in which the sequential characteristic information of the user is reflected. In this case, the electronic apparatus 1000 may calculate a loss (Lmain in FIG. 2) related to the main task (e.g., a user's score prediction task, a problem recommendation task, and/or a dropout prediction task) using the user embedding vector, and train a model related to the main task based on the calculated loss. According to the present embodiment, by using a user embedding vector in which the sequential characteristic information of the user is reflected to train the model related to the main task, it is possible to increase the performance or accuracy of the main task.

Meanwhile, in FIG. 3, training the sequence encoder by acquiring first and second embedding vectors, first and second reference vectors, first and second hidden vectors, and first and second projection embedding vectors for the first user, and acquiring third and fourth embedding vectors, third and fourth reference vectors, third and fourth hidden vectors, and third and fourth projection embedding vectors for the second user has been described. However, this is only for convenience of description, and the sequence encoder may be trained by acquiring any L embedding vectors, any L reference vectors, any L hidden vectors, and any L projection embedding vectors for each of any N users.

Meanwhile, in FIG. 3, it has been described that the sequence encoder is trained based on a specific vector. However, this is only for convenience of description, and it goes without saying that the sequence encoder may be trained based on a plurality of positive pairs and a plurality of negative pairs.

Hereinafter, a method of training a sequence encoder according to an embodiment of the present application and an electronic apparatus for performing the same will be described with reference to FIGS. 4 to 7. In describing the method of training a sequence encoder and the electronic apparatus for performing the same according to the embodiment of the present application, some embodiments overlapping those previously described with reference to FIGS. 2 and 3 may be omitted. However, this is only for convenience of description and should not be construed as being limited thereto.

Figure 4:
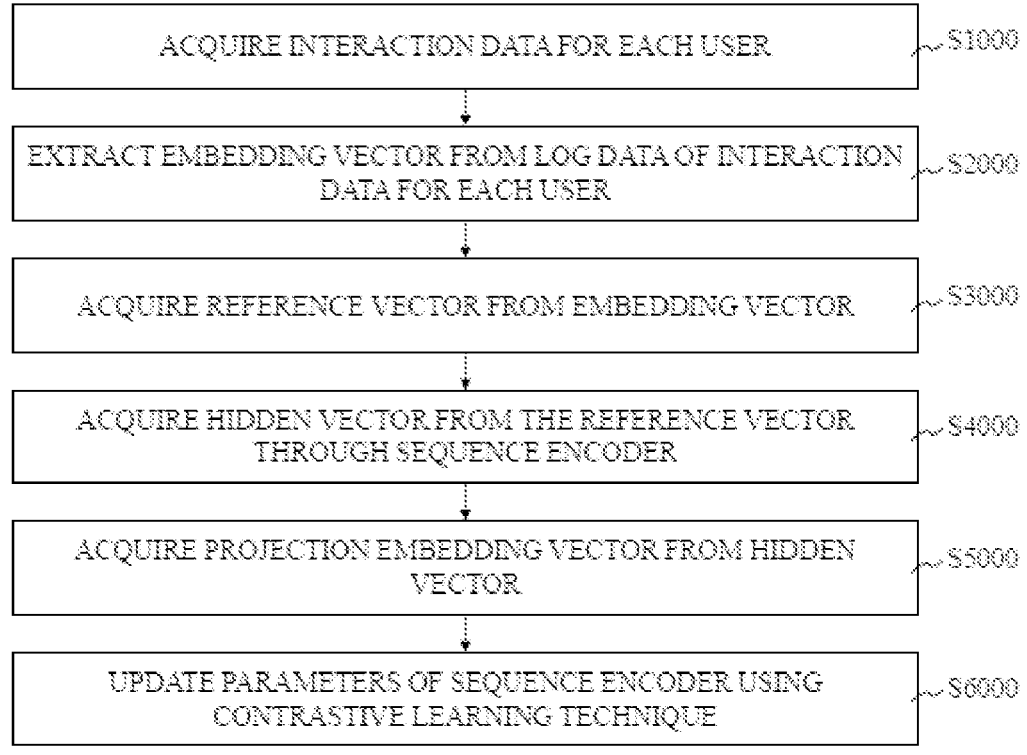
FIG. 4 is a flowchart illustrating a method of training a sequence encoder for extracting sequential characteristic information of a user according to an embodiment of the present application.

FIG. 4 is a flowchart illustrating a method of training a sequence encoder for extracting sequential characteristic information of a user according to an embodiment of the present application.

A method of training a sequence encoder according to an embodiment of the present application includes acquiring interaction data for each user (S1000), extracting an embedding vector from log data of the interaction data for each user (S2000), acquiring a reference vector from the embedding vector (S3000), acquiring a hidden vector from the reference vector through a sequence encoder (S4000), acquiring a projection embedding vector from the hidden vector (S5000), and updating parameters of a sequence encoder using a contrastive learning technique (S6000).

In the operation (S1000) of acquiring the interaction data for each user, the electronic apparatus 1000 may receive first interaction data including first log data of a first user at a first point in time and second log data of the first user at a second point in time through the transceiver 1100. Here, the first log data and the second log data may include arbitrary information acquired according to the interaction between the first user and the user terminal, including user ID information of the first user at each point in time, information on correctness for a problem of the first user, and/or dropout information of the first user.

Furthermore, in the operation (S1000) of acquiring the interaction data for each user, the electronic apparatus 1000 may receive second interaction data including third log data of the second user at a third point in time and fourth log data at a fourth point in time of the second user through the transceiver 1100. Here, the third log data and the fourth log data may include arbitrary information acquired according to the interaction between the second user and the user terminal, including user ID information of the second user at each point in time, information on correctness for a problem of the second user, and/or dropout information of the second user.

Furthermore, in the operation (S2000) of extracting the embedding vector from the log data of the interaction data for each user, the electronic apparatus 1000 may input the first interaction data of the first user to the embedder and acquire the embedding vector output through the embedder. In detail, the electronic apparatus 1000 may acquire a first embedding vector from first log data and a second embedding vector from the second log data through the embedder. Here, the first embedding vector is a vector acquired by vectorizing interaction data of the first user at the first point in time, and the second embedding vector is a vector acquired by vectorizing interaction data of the first user at the second point in time.

Furthermore, in the operation (S2000) of extracting the embedding vector from the log data of the interaction data for each user, the electronic apparatus 1000 may input the second interaction data of the second user to the embedder and acquire the embedding vector output through the embedder. In detail, the electronic apparatus 1000 may acquire a third embedding vector from the third log data and a fourth embedding vector from the fourth log data through the embedder. Here, the third embedding vector is a vector acquired by vectorizing interaction data of the second user at the third point in time, and the fourth embedding vector is a vector acquired by vectorizing interaction data of the second user at the fourth point in time.

In the operation (S3000) of acquiring the reference vector from the embedding vector, the electronic apparatus 1000 may acquire a first reference vector from the first embedding vector for the first user and a second reference vector from the second embedding vector for the first user through a first projection layer configured to project a vector on a first vector space to a vector on a second vector space.

Furthermore, in the operation (S3000) of acquiring the reference vector from the embedding vector, the electronic apparatus 1000 may acquire a third reference vector from the third embedding vector for the second user and a fourth reference vector from the fourth embedding vector for the second user through the first projection layer configured to project the vector on the first vector space to the vector on the second vector space.

In the operation (S4000) of acquiring the hidden vector from the reference vector through the sequence encoder, the electronic apparatus 1000 may acquire a first hidden vector from the first embedding vector for the first user and a second hidden vector from the second embedding vector for the first user through the sequence encoder (e.g., an RNN or transformer type encoder). Furthermore, in the operation (S4000) of acquiring the hidden vector from the reference vector through the sequence encoder, the electronic apparatus 1000 may acquire a third hidden vector from the third embedding vector for the second user and a fourth hidden vector from the fourth embedding vector for the second user through the sequence encoder (e.g., an RNN or transformer type encoder).

In the operation (S5000) of acquiring the projection embedding vector from the hidden vector, the electronic apparatus 1000 may acquire a first projection embedding vector from the first hidden vector for the first user and a second projection embedding vector from the second hidden vector for the first user through a second projection layer (e.g., a layer in the form of a multi-layer perceptron (MLP)) configured to project the vector on the first vector space to the vector on the third vector space.

Furthermore, in the operation (S5000) of acquiring the projection embedding vector from the hidden vector, the electronic apparatus 1000 may acquire a third projection embedding vector from the third hidden vector for the second user and a fourth projection embedding vector from the fourth hidden vector for the second user through the second projection layer (e.g., a layer in the form of the multi-layer perceptron (MLP)) configured to project the vector on the first vector space to the vector on the third vector space.

In the operation (S6000) of updating the parameters of the sequence encoder using the contrastive learning technique, the electronic apparatus 1000 may use the contrastive learning technique to update the parameters of the sequence encoder based on a projection embedding vector set (e.g., first projection embedding vector and/or second projection embedding vector) acquired from first interaction data of the first user, a reference vector set (e.g., first reference vector and/or second reference vector), a projection embedding vector set (e.g., third projection embedding vector and/or fourth projection embedding vector) acquired from the interaction data of the second user, and/or a reference vector set (e.g., third reference vector and/or fourth reference vector), thereby training the neural network model.

Hereinafter, the operation (S6000) of updating the parameters of the sequence encoder according to the embodiment of the present application will be described in more detail with reference to FIGS. 5 to 7.

FIG. 5 is a flowchart embodying the operation of updating the parameters of the sequence encoder (S6000) according to the embodiment of the present application.

According to the embodiment of the present application, the operation (S6000) of updating the parameters of the sequence encoder may further include acquiring a first projection embedding vector set including at least one of the first projection embedding vector and the second projection embedding vector for the first user and a first reference vector set including at least one of the first reference vector and the second reference vector for the first user (S6112), and updating the parameters of the sequence encoder to output the first hidden vector and the second hidden vector such that a distance between a projection embedding vector included in the first projection embedding vector set and a reference vector included in the first reference vector set becomes closer (S6114).

In operation S6112, the electronic apparatus 1000 may acquire the first projection embedding vector set including at least one of the first projection embedding vector and the second projection embedding vector for the first user through the second projection layer, and acquire the first reference vector set including at least one of the first reference vector and the second reference vector for the first user through the first projection layer (S6112).

In the operation (S6114) of updating the parameters of the sequence encoder to output the first hidden vector and the second hidden vector such that the distance between the projection embedding vector included in the first projection embedding vector set and the reference vector included in the first reference vector set becomes closer, the electronic apparatus 1000 may use the user ID information included in the first log data and the second log data of the first interaction data to determine that both the projection embedding vector (e.g., the first projection embedding vector and/or second projection embedding vector) included in the first projection embedding vector set and the reference vector (e.g., first reference vector and/or second reference vector) included in the first reference vector set are acquired from the interaction data of the first user. In this case, the electronic apparatus 1000 may be configured to calculate a loss function value to output the first hidden vector and the second hidden vector such that the distance between the projection embedding vector (e.g., first projection embedding vector and/or second projection embedding vector) included in the first projection embedding vector set and the reference vector (e.g., first reference vector and/or second reference vector) included in the first reference vector set becomes closer, and update the parameters of the sequence encoder based on the calculated loss function value.

Meanwhile, in FIG. 5, the updating of the parameters of the sequence encoder based on the projection embedding vector and the reference vector calculated from the first interaction data of the first user has been mainly described. However, this is only for convenience of description, and the contents described with reference to FIG. 5 may be inferred and applied to updating the parameters of the sequence encoder based on the projection embedding vector and the reference vector calculated from the second interaction data of the second user. For example, the electronic apparatus 1000 may use the user ID information included in the third log data and the fourth log data of the second interaction data to determine that both the projection embedding vector (e.g., third projection embedding vector and/or fourth projection embedding vector) included in the second projection embedding vector set and the reference vector (e.g., third projection embedding vector and/or fourth reference vector) included in the second reference vector set are acquired from the interaction data of the second user. In this case, the electronic apparatus 1000 may be configured to calculate a loss function value to output the third hidden vector and the fourth hidden vector such that the distance between the projection embedding vector (e.g., third projection embedding vector and/or fourth projection embedding vector) included in the second projection embedding vector set and the reference vector (e.g., third reference vector and/or fourth reference vector) included in the second reference vector set becomes closer, and update the parameters of the sequence encoder based on the calculated loss function value.

FIG. 6 is a flowchart embodying the operation (S6000) of updating the parameters of the sequence encoder according to the embodiment of the present application.

The operation (S6000) of updating the parameters of the sequence encoder according to the embodiment of the present application may further include: acquiring a second projection embedding vector set including at least one of the third projection embedding vector and the fourth projection embedding vector for a second user and a second reference vector set including at least one of the third reference vector and the fourth reference vector for the second user (S6122), and updating the parameters of the sequence encoder to output a first hidden vector to a fourth hidden vector such that a distance between the projection embedding vector included in the first projection embedding vector set for the first user and the reference vector included in the second reference vector set for the second user increases or a distance between the reference vector included in the first reference vector set for the first user and the projection embedding vector included in the second projection embedding vector for the second user increases (S6124).

In operation S6122, the electronic apparatus 1000 may acquire the second projection embedding vector set including at least one of the third projection embedding vector and the fourth projection embedding vector for the second user through the second projection layer, and acquire the second reference vector set including at least one of the third reference vector and the fourth reference vector for the second user through the second projection layer.

In the operation (S6124) of updating the parameters of the sequence encoder to output the first hidden vector to the fourth hidden vector such that the distance between the projection embedding vector included in the first projection embedding vector set for the first user and the reference vector included in the second reference vector set for the second user increases or the distance between the reference vector included in the first reference vector set for the first user and the projection embedding vector included in the second projection embedding vector for the second user increases, the electronic apparatus 1000 may use the user ID information included in the log data of the second interaction data to determine that both the projection embedding vector (e.g., third projection embedding vector and/or fourth projection embedding vector) included in the second projection embedding vector set and the reference vector (e.g., third reference vector and/or fourth reference vector) included in the second reference vector set are acquired from the interaction data of the second user. In this case, the electronic apparatus 1000 may be configured to calculate a loss function value to output the first hidden vector to the fourth hidden vector such that the distance between the projection embedding vector (e.g., first projection embedding vector and/or second projection embedding vector) included in the first projection embedding vector set and the reference vector (e.g., third reference vector and/or fourth reference vector) included in the second reference vector set as described above becomes closer, and update the parameters of the sequence encoder based on the calculated loss function value. Alternatively, the electronic apparatus 1000 may be configured to calculate a loss function value to output the first hidden vector to the fourth hidden vector such that the distance between the projection embedding vector (e.g., third projection embedding vector and/or fourth projection embedding vector) included in the second projection embedding vector set and the reference vector (e.g., first reference vector and/or second reference vector) included in the first reference vector set as described above becomes closer, and update the parameters of the sequence encoder based on the calculated loss function value.

According to the embodiment of the present application, by extracting similar sequential characteristic information (i.e., sequential characteristic information within a certain range) from the interaction data of the same user, extracting different sequential characteristic information (i.e., sequential characteristic information within a certain range or more) from interaction data of different users, and reflecting the extracted sequential feature information to recommend problems, predict scores, or predict dropouts, it is possible to recommend more optimized problems for individual users or increase the accuracy of score prediction or dropout prediction.

FIG. 7 is a flowchart embodying the operation (S6000) of updating the parameters of the sequence encoder according to the embodiment of the present application.

According to the embodiment of the present application, the operation (S6000) of updating the parameters of the sequence encoder may further include acquiring first label information corresponding to the first projection embedding vector and the first reference vector and related to correctness for a specific problem based on the first log data, and acquiring second label information corresponding to the third projection embedding vector and the third reference vector and related to the correctness for the specific problem based on the third log data (S6210), and updating the parameters of the sequence encoder based on the first label information and the second label information (S6220).

In the operation (S6210) of acquiring the first label information corresponding to the first projection embedding vector and the first reference vector and related to the correctness for the specific problem based on the first log data, and acquiring the second label information corresponding to the third projection embedding vector and the third reference vector and related to the correctness for the specific problem based on the third log data, the electronic apparatus 1000 may acquire the first label information corresponding to the first projection embedding vector and the first reference vector and related to the correctness for the specific problem of the first user based on the first log data at the first point in time. Furthermore, the electronic apparatus 1000 may acquire the second label information corresponding to the third projection embedding vector and the third reference vector and related to the correctness for the specific problem of the second user based on the third log data at the third point in time. However, this is only an example, and the electronic apparatus 1000 may acquire the first label information and/or second label information manually labeled by an operator.

In the operation (S6220) of updating the parameters of the sequence encoder based on the first label information and the second label information, the electronic apparatus 1000 may be configured to update the parameters of the sequence encoder based on the first label information and the second label information related to the correctness for the specific problem.

For example, when the first label information and the second label information related to the correctness for the specific problem are the same, the electronic apparatus 1000 may be configured to update the parameters of the sequence encoder such that the distance between the projection embedding vector corresponding to the first label information and the reference vector corresponding to the second label information becomes closer. Specifically, when the first label information and the second label information are the same (e.g., when the correctness for the specific problem of the first user at the first point in time matches the correctness for the specific problem of the second user at the third point in time), the electronic apparatus 1000 may be configured to update the parameters of the sequence encoder to output the first hidden vector and the third hidden vector such that the distance between the first projection embedding vector of the first user and the third reference vector of the second user becomes closer. Alternatively, when the first label information and the second label information are the same (e.g., when the correctness for the specific problem of the first user at the first point in time matches the correctness for the specific problem of the second user at the third point in time), the electronic apparatus 1000 may be configured to update the parameters of the sequence encoder to output the first hidden vector and the third hidden vector such that the distance between the first reference vector of the first user and the third projection embedding vector of the second user becomes closer.

For example, when the first label information and the second label information related to the correctness for the specific problem are different, the electronic apparatus 1000 may be configured to update the parameters of the sequence encoder to output the hidden vector such that the distance between the projection embedding vector (or reference vector) corresponding to the first label information and the reference vector (or projection embedding vector) corresponding to the second label information increases. Specifically, when the first label information and the second label information are different (e.g., when the correctness for the specific problem of the first user at the first point in time does not match the correctness for the specific problem of the second user at the third point in time), the electronic apparatus 1000 may be configured to update the parameters of the sequence encoder to output the first hidden vector and the third hidden vector such that the distance between the first projection embedding vector of the first user and the third reference vector of the second user increases. Alternatively, when the first label information and the second label information are different (i.e., when the correctness for the specific problem of the first user at the first point in time does not match the correctness for the specific problem of the second user at the third point in time), the electronic apparatus 1000 may be configured to update the parameters of the sequence encoder to output the first hidden vector and the third hidden vector such that the distance between the first reference vector of the first user and the third projection embedding vector of the second user increases.

As another example, when the correctness for the specific problem of the first user at the first point in time matches the correctness for the specific problem of the first user at the second point in time, the electronic apparatus 1000 may be configured to update the parameters of the sequence encoder to output the first hidden vector and the second hidden vector such that the distance between the first projection embedding vector of the first user and the second reference vector of the first user becomes closer. Alternatively, when the correctness for the specific problem of the first user at the first point in time matches the correctness for the specific problem of the first user at the second point in time, the electronic apparatus 1000 may be configured to update the parameters of the sequence encoder to output the first hidden vector and the second hidden vector such that the distance between the first reference vector of the first user and the second projection embedding vector of the first user becomes closer.

As another example, when the correctness for the specific problem of the first user at the first point in time does not match the correctness for the specific problem of the first user at the second point in time, the electronic apparatus 1000 may be configured to update the parameters of the sequence encoder to output the first hidden vector and the second hidden vector such that the distance between the first projection embedding vector of the first user and the second reference vector of the first user increases. Alternatively, when the correctness for the specific problem of the first user at the first point in time does not match the correctness for the specific problem of the first user at the second point in time, the electronic apparatus 1000 may be configured to update the parameters of the sequence encoder to output the first hidden vector and the second hidden vector such that the distance between the first reference vector of the first user and the second projection embedding vector of the first user increases.

According to the embodiment of the present application, by training the sequence encoder to output the label information such that the distance between the hidden vectors corresponding to the same label information becomes close or the distance between the hidden vectors corresponding to different label information increases regardless of the user, when the label information is similar, it is possible to extract similar sequential characteristic information (i.e., sequential characteristic information within a certain range), and when the label information is not similar, it is possible to extract different sequential characteristic information (i.e., sequential characteristic information over a certain range). Furthermore, by reflecting the extracted sequential characteristic information to recommend problems, predict scores, or predict dropouts, it is possible to recommend more optimized problems for individual users or increase the accuracy of score prediction or dropout prediction.

According to the method and electronic apparatus for training a sequence encoder according to an embodiment of the present application, it is possible to train the sequence encoder to calculate sequential characteristic information of a user, and train a model related to a correct answer prediction task for a user's problem, a score prediction task, a user-personalized problem recommendation task, and a dropout prediction task by reflecting the sequential characteristic information of the user to allow each task to calculate personalized information for the user.

Furthermore, according to the method and electronic apparatus for training a sequence encoder according to the embodiment of the present application, it is possible to train a sequence encoder to output hidden vectors by reflecting sequential interaction data at a patch level (i.e., time unit) to calculate user-personalized information over time in which sequential features are reflected.

Various operations of the electronic apparatus 1000 may be stored in the memory 1200 of the electronic apparatus 1000, and the processor 1300 of the electronic apparatus 1000 may be provided to perform the operations stored in the memory 1200.

According to the method and electronic apparatus for training a sequence encoder according to one embodiment of the present application, it is possible to train the sequence encoder to calculate sequential characteristic information of a user, and train a model related to a correct answer prediction task for a user's problem, a score prediction task, a user-personalized problem recommendation task, and a dropout prediction task by reflecting the sequential characteristic information of the user to allow each task to calculate personalized information for the user.

According to the method and electronic apparatus for training a sequence encoder according to one embodiment of the present application, it is possible to train a sequence encoder to output hidden vectors by reflecting sequential interaction data at a patch level (i.e., time unit) to calculate user-personalized information over time in which sequential features are reflected.

Effects of the present invention are not limited to the above-described effects, and effects that are not mentioned will be clearly understood by those skilled in the art to which the present disclosure pertains from the present specification and the accompanying drawings.

Features, structures, effects, etc., described in the above embodiments are included in at least one embodiment of the present disclosure, and are not necessarily limited only to the one embodiment. Furthermore, features, structures, effects, etc., illustrated in each embodiment can be practiced by being combined or modified for other embodiments by those of ordinary skill in the art to which the embodiments pertain. Accordingly, the contents related to such combinations and modifications should be interpreted as being included in the scope of the present invention.

Although exemplary embodiments of the present invention have been mainly described hereinabove, these are only examples and do not limit the present invention. Those skilled in the art to which the present invention pertains may understand that several modifications and applications that are not described in the present specification may be made without departing from the spirit of the present invention. That is, each component specifically shown in the embodiment may be implemented by modification. In addition, differences associated with these modifications and applications are to be interpreted as being included in the scope of the present specification as defined by the following claims.

What is claimed is:

1. A method of training a sequence encoder by an electronic apparatus that extracts sequential characteristic information of a user based on interaction data indicating an interaction between the user and a user terminal, the method comprising:

acquiring interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem;

extracting, through an embedder, a first embedding vector from the first log data, extracting a second embedding vector from the second log data, extracting a third embedding vector from the third log data, and extracting a fourth embedding vector from the fourth log data;

projecting, through a projection layer, a vector on a first vector space to a vector on a second vector space to acquire a first reference vector from the first embedding vector, a second reference vector from the second embedding vector, a third reference vector from the third embedding vector, and a fourth reference vector from the fourth embedding vector;

acquiring, through the sequence encoder, a first hidden vector from the first embedding vector, a second hidden vector from the second embedding vector, a third hidden vector from the third embedding vector, and a fourth hidden vector from the fourth embedding vector;

projecting, through the projection layer, the vector on the first vector space to a vector on a third vector space to acquire a first projection embedding vector from the first hidden vector, a second projection embedding vector from the second hidden vector, a third projection embedding vector from the third hidden vector, and a fourth projection embedding vector from the fourth hidden vector; and updating a parameter of the sequence encoder using a contrastive learning technique.

2. The method of claim 1, wherein the updating of the parameter of the sequence encoder includes:

acquiring a first projection embedding vector set including at least one of the first projection embedding vector and the second projection embedding vector for the first user and a first reference vector set including at least one of the first reference vector and the second reference vector for the first user; and updating the parameter of the sequence encoder to output the first hidden vector and the second hidden vector such that a distance between a projection embedding vector included in the first projection embedding vector set and a reference vector included in the first reference vector set becomes closer.

3. The method of claim 2, wherein the updating of the parameter of the sequence encoder further includes:

acquiring a second projection embedding vector set including at least one of the third projection embedding vector and the fourth projection embedding vector for the second user and a second reference vector set including at least one of the third reference vector and the fourth reference vector for the second user; and updating the parameter of the sequence encoder to output the third hidden vector and the fourth hidden vector such that a distance between a projection embedding vector included in the second projection embedding vector set and a reference vector included in the second reference vector set becomes closer.

4. The method of claim 3, wherein the updating of the parameter of the sequence encoder further includes updating the parameter of the sequence encoder to output the first hidden vector to the fourth hidden vector such that a distance between the projection embedding vector included in the first projection embedding vector set for the first user and the reference vector included in the second reference vector set for the second user increases or a distance between the reference vector included in the first reference vector set for the first user and the projection embedding vector included in the second projection embedding vector set for the second user increases.

5. The method of claim 1, wherein the updating of the parameter of the sequence encoder further includes:

acquiring first label information corresponding to the first projection embedding vector and the first reference vector and related to correctness for a specific problem based on the first log data, and acquiring second label information corresponding to the third projection embedding vector and the third reference vector and related to the correctness for the specific problem based on the third log data; and updating the parameter of the sequence encoder based on the first label information and the second label information.

6. The method of claim 5, wherein the updating of the parameter of the sequence encoder based on the first label information and the second label information includes, when the first label information and the second label information are the same, updating the parameter of the sequence encoder to output the first hidden vector and the third hidden vector such that a distance between the first projection embedding vector and the third reference vector becomes closer or a distance between the third projection embedding vector and the first reference vector becomes closer.

7. The method of claim 5, wherein the updating of the parameter of the sequence encoder based on the first label information and the second label information includes, when the first label information and the second label information are different, updating the parameter of the sequence encoder to output the first hidden vector and the third hidden vector such that a distance between the first projection embedding vector and the third reference vector increases or a distance between the third projection embedding vector and the first reference vector increases.

8. A non-transitory computer-readable recording medium in which a computer program executed by a computer is recorded, the computer program comprising:

acquiring interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem;

extracting, through an embedder, a first embedding vector from the first log data, extracting a second embedding vector from the second log data, extracting a third embedding vector from the third log data, and extracting a fourth embedding vector from the fourth log data;

projecting, through a projection layer, a vector on a first vector space to a vector on a second vector space to acquire a first reference vector from the first embedding vector, a second reference vector from the second embedding vector, a third reference vector from the third embedding vector, and a fourth reference vector from the fourth embedding vector;

acquiring, through the sequence encoder, a first hidden vector from the first embedding vector, a second hidden vector from the second embedding vector, a third hidden vector from the third embedding vector, and a fourth hidden vector from the fourth embedding vector;

projecting, through the projection layer, the vector on the first vector space to a vector on a third vector space to acquire a first projection embedding vector from the first hidden vector, a second projection embedding vector from the second hidden vector, a third projection embedding vector from the third hidden vector, and a fourth projection embedding vector from the fourth hidden vector; and updating a parameter of the sequence encoder using a contrastive learning technique.

9. An electronic apparatus comprising:

a transceiver configured to receive interaction data indicating an interaction between a user and a user terminal; and a processor configured to train a sequence encoder for extracting sequential characteristic information of a user based on the interaction data, wherein the processor is configured to acquire interaction data for each user, the interaction data including first log data of a first user at a first point in time and second log data of the first user at a second point in time, and third log data of a second user at a third point in time and fourth log data of the second user at a fourth point in time, and each of the first log data to the fourth log data includes user ID information and information on correctness for a user's problem, extract, through an embedder, a first embedding vector from the first log data, extract a second embedding vector from the second log data, extract a third embedding vector from the third log data, and extract a fourth embedding vector from the fourth log data, project, through a projection layer, a vector on a first vector space to a vector on a second vector space to acquire a first reference vector from the first embedding vector, a second reference vector from the second embedding vector, a third reference vector from the third embedding vector, and a fourth reference vector from the fourth embedding vector, acquire, through the sequence encoder, a first hidden vector from the first embedding vector, a second hidden vector from the second embedding vector, a third hidden vector from the third embedding vector, and a fourth hidden vector from the fourth embedding vector, project, through the projection layer, the vector on the first vector space to a vector on a third vector space to acquire a first projection embedding vector from the first hidden vector, a second projection embedding vector from the second hidden vector, a third projection embedding vector from the third hidden vector, and a fourth projection embedding vector from the fourth hidden vector, and update the parameter of the sequence encoder using a contrastive learning technique.

* * * * *